Feb. 20, 1962        C. EYRAUD ET AL        3,022,187
POROUS MEMBRANES OF VERY FINE POROSITY, AND
PROCESSES FOR PRODUCTION THEREOF
Filed Feb. 18, 1959
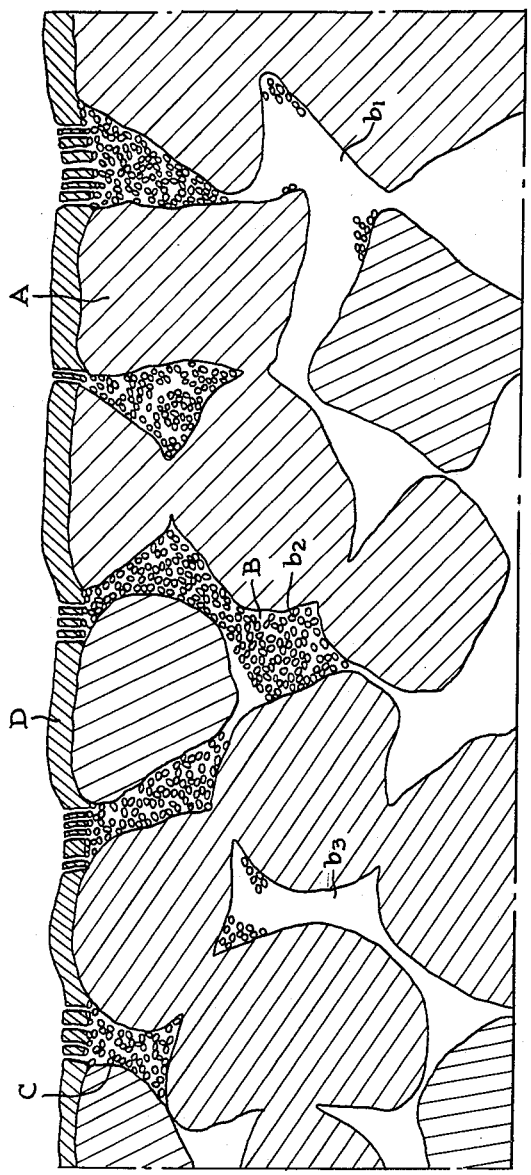

United States Patent Office 3,022,187
Patented Feb. 20, 1962

3,022,187
POROUS MEMBRANES OF VERY FINE POROSITY AND PROCESSES FOR PRODUCTION THEREOF
Charles Eyraud, Marcel Prettre, Yves Trambouze, Jeannine Lenoir, and Germaine Thomas, Lyon, and Pierre Plurien, Paris, France, assignors to Commissariat a l'Energie Atomique, Paris, France
Claims priority, application France Feb. 24, 1958
Filed Feb. 18, 1959, Ser. No. 793,968
12 Claims. (Cl. 117—16)

It is known that the permeability of a barrier increases, at constant pore radius, in inverse ratio to its thickness. To obtain porous membranes of very small pore radii and possessing a high permeability requires as thin a membrane as possible. Limitations are imposed on thinness by conditions of mechanical strength, resistance to deterioration by vibration, by destruction of the surface by a gas stream, and the like.

Porous membranes made by known processes have no external protection or support.

The present invention relates to novel processes for the production of membranes of very fine porosity and to the novel membranes obtained by these processes.

These processes are characterized in that, in the interior of a rigid support having relatively large pores, a membrane is constructed of very fine porosity by filling the relatively large pores with submicronic grains having very fine channels between them. Deposit of the grains may be obtained by suction of a solid-gas or solid-liquid suspension through the support. If desired, the assembly thus formed may be covered with a thin metallic film having a thickness of from 500 to 5000 A. which protects the fine grains without impairing porosity. This film may be obtained by any known metallization process.

The required external mechanical strength (rigidity) of the membrane is provided by a very permeable strong support, having pores of a large radius, for example a sintered metal such as steel, nickel or bronze. Within the pores of the sintered metal, which may have diameters of from ten to several tens of microns, a membrane of very fine porosity is constructed by passing through the relatively large pores of the support a solid-gas or solid liquid suspension containing submicronic grains of a metal oxide which are monodispersed as much as possible. The order of magnitude of these grains is from one micron to several hundredths of a micron. Better surface cohesion is provided to obtain more efficient protection against the external agents which might tear away the fine grains. This may be done by metallizing the active surface of the membrane. Experience has shown that when the metal is suitably fixed, the pores are not obturated and the material is deposited substantially normal to the fine grains of the surface.

After this treatment, the active portion of the membrane is formed by the deposit of the fine grains and by the addition of the metal film. The thickness of this active portion may be on the order of one to several tens of microns.

The main advantage of the membranes of the present invention is that they have excellent mechanical strength, are very thin and have great permeability. The radius of the pores may be determined as desired by choice of the radius of the grains in the suspension.

Metallization, as described above, can be obtained by any known metallization process, for example by evaporation of metal under vacuum, or by deposition by chemical reduction of a metal salt. By evaporation under vacuum of various metals such as Al, Ni, Cu, and the like, it is possible to produce porous metallic films whose distribution and channels correspond to the relief of the stopping surface. The dry membranes are kept away from atmospheric moisture in order to avoid oxidation causing migration of the metals in the form of ions.

The membranes of the present invention are particularly suited for ultrafiltration and for separation by gaseous diffusion of the constituents of a mixture. Suitable choice of the different components of the membranes of the present invention provides resistance to the various types of corrosion.

The accompanying drawing is a cross-sectional view through a representative embodiment of a porous membrane prepared in accordance with the processes described herein. This drawing shows a thin metallic film deposited on the support penetrating superficial surface zones depending upon the presence of the grains of metallic oxide deposited in the support. In this drawing A is the sintered metallic support; B are the large pores of the support; C is a submicronic particle of metallic oxide; and D is the thin metallic film.

The submicronic grains of metallic oxide C completely fill at least the surface pores B of the support, this being a critical feature of the invention; and the pores of the support beneath the surface are filled completely as at $b_2$ or partially filled as at $b_1$ and $b_3$. The depth of penetration of the grains of metallic oxide is on the order of one $\mu$ to seventy $\mu$. The porous structure of the present concept must be understood as tri-dimensional so that the pores which appear to be closed in the accompanying drawing are actually connected to neighboring pores. This is true for the large pores of the support and for the pores provided by the spaces between the submicronic grains of metal oxide.

Specific embodiments of the present invention will now be described to illustrate the invention without thereby limiting the scope of the inventive concept. The processes described in connection with these embodiments are to be considered as forming part of the invention, it being understood that equivalent processes may be used without departing from the scope thereof.

Example I

The support consists of a disk of sintered stainless steel having a pore diameter of about 30 microns. Through this disk a suspension in water of 1 g. per liter of $TiO_2$ is drawn under vacuum. The grains of the suspension have an average size of 100 to 150 A.

If a surface-active agent is added as, for example a drop of a commercial solution of "Teelpol" per 10 liters of suspension the surface layer is then formed by agglomerates comprising only a few elementary grains. "Teepol" is a mixture of the sodium salts of sulfated fatty alcohols made by reducing the mixed fatty acids of coconut oil or of cottonseed oil or fish oils.

The membrane is then dried under vacuum, in the cold and the radius of the pores is 0.06 micron and the permeability $\overline{G}=315\times 10^{-7}$ mole air/sq. cm./minute/cm. of Hg.

Example II

On the membrane prepared as in Example I, there is deposited by evaporation under a vacuum of $10^{-4}$ mm. of Hg a layer of copper having a thickness of 2,000 A.

The radius of the pores $\bar{r}$ measured by a permeameter is 0.06 micron and the permeability is $200\times 10^{-7}$ mole air/sq. cm./minute/cm. of Hg.

Example III

The support consists of a disk of sintered stainless steel having a mean diameter of the pores of about 30 microns. Through this disk is drawn first a suspension of 1 g. per liter of $TiO_2$ in water with "Teepol" as the surface-active agent (one drop of commercial solution per 10 liters of suspension) and dispersion is then obtained by centrifuging of the support and contained suspension at 6,000 r.p.m. for 3 hours.

The membrane is then dried under vacuum in the cold and $\bar{r}=0.055$ micron and $\bar{G}=260\times10^{-7}$ mole air/sq. cm./minute/cm. of Hg.

*Example IV*

On the membrane prepared as in Example III, there is deposited by evaporation under a vacuum of $10^{-4}$ mm. of Hg a layer of nickel having a thickness of 1600 A.

In this membrane $\bar{r}=0.050$ micron and $\bar{G}=240\times10^{-7}$ mole air/sq. cm./minute/cm. of Hg.

Changes in or modifications to the above described illustrative embodiments of the present invention may now be suggested to those skilled in the art without departing from the inventive concept. Reference should therefore be had to the appended claims to determine the scope of the invention.

What is claimed is:

1. In a process for making a porous membrane for separation by gaseous diffusion of the constituents of a mixture, the step of permanently depositing submicronic grains of a metallic oxide having dimensions on the order of 100 to 10,000 A, within a rigid sintered metallic support of relatively large pore size of from ten to several tens of microns by drawing by suction a suspension of the grains in a fluid through the support.

2. A process as described in claim 1 in which the grains have diameters on the order of 100 to 150 A.

3. A process as described in claim 1 in which the grains are $TiO_2$.

4. In a process for making a porous membrane for separation by gaseous diffusion of the constituents of a mixture, the steps of permanently depositing submicronic grains of a metallic oxide having dimensions on the order of 100 to 10,000 A. within a rigid sintered metallic support of relatively large pore size of from ten to several tens of microns by drawing by suction a suspension of the grains in a fluid through the support and then covering the rigid support containing the submicronic grains with a metallic film having a thickness of from 500 to 5000 A.

5. A process as described in claim 4 in which the metallic film is obtained by evaporation of metal under vacuum.

6. A process as described in claim 4 in which the metallic film is obtained by deposition by chemical reduction of a metal salt.

7. In a process of making a porous membrane for separation by gaseous diffusion of the constituents of a mixture, the steps of permanently depositing submicronic grains of a metallic oxide having dimensions on the order of 100 to 10,000 A. within a rigid support of relatively large pore size of from ten to several tens of microns selected from the group consisting of sintered steel, sintered nickel, sintered bronze and sintered stainless steel by drawing by suction a suspension of the grains in a fluid through the support.

8. In a process of making a porous membrane for separation by gaseous diffusion of the constituents of a mixture, the steps of permanently depositing submicronic grains of a metallic oxide having dimensions on the order of 100 to 10,000 A. within a rigid support of relatively large pore size of from ten to several tens of microns selected from the group consisting of sintered steel, sintered nickel, sintered bronze and sintered stainless steel by drawing by suction a suspension of the grains in a fluid through the support and then of covering the rigid support containing the submicronic grains with a metallic film having a thickness of from 500 to 5000 A.

9. A process as described in claim 8 in which the metallic film is obtained by evaporation of metal under vacuum.

10. A process as described in claim 8 in which the metallic film is obtained by deposition by chemical reduction of a metal salt.

11. A porous membrane comprising a rigid support selected from the group consisting of sintered steel, sintered nickel, sintered bronze and sintered stainless steel the pores of which are from ten to several tens of microns and permanently contain submicronic grains of a metal oxide having dimensions on the order of 100 to 10,000 A.

12. A porous membrane as described in claim 11 including a thin metallic film having a thickness of from 500 to 5000 A. covering the rigid support.

References Cited in the file of this patent

UNITED STATES PATENTS

| | | |
|---|---|---|
| 2,157,596 | Davis | May 9, 1939 |
| 2,618,565 | Nicholson | Nov. 18, 1952 |
| 2,824,620 | De Rosset | Feb. 25, 1958 |

OTHER REFERENCES

Lawlor: Diatomite Filtration, Water and Sewage Works, Reference Number, June 15, 1956, R–189, R–190.

UNITED STATES PATENT OFFICE
CERTIFICATE OF CORRECTION

Patent No. 3,022,187            February 20, 1962

Charles Eyraud

It is hereby certified that error appears in the above numbered patent requiring correction and that the said Letters Patent should read as corrected below.

Column 2, line 47, for '"Teelpol"' read -- "Teepol" --; column 3, line 24, for "A," read -- A. --; column 4, line 3, for "steps" read -- step --.

Signed and sealed this 12th day of June 1962.

(SEAL)
Attest:

ERNEST W. SWIDER
Attesting Officer

DAVID L. LADD
Commissioner of Patents